United States Patent [19]

Froeburg et al.

[11] Patent Number: 5,812,959
[45] Date of Patent: Sep. 22, 1998

[54] AUTOMATED VEHICLE RECOMMENDATION SYSTEM

[75] Inventors: Peter L. Froeburg, Cupertino; Robert P. Laudati, Sunnyvale, both of Calif.

[73] Assignee: Trimble Navigation Limited, Sunnyvale, Calif.

[21] Appl. No.: 607,468

[22] Filed: Feb. 27, 1996

[51] Int. Cl.$^6$ ................................................. G06F 19/00
[52] U.S. Cl. ..................... 701/117; 701/204; 701/208
[58] Field of Search .................. 364/436, 449.2, 364/446, 460, 462; 701/117, 204, 208, 300, 302; 340/988, 989, 990

[56] References Cited

U.S. PATENT DOCUMENTS

| | | | |
|---|---|---|---|
| 3,694,579 | 9/1972 | McMurray | 179/5 R |
| 3,886,553 | 5/1975 | Bates | 343/112 R |
| 4,494,119 | 1/1985 | Wimbosh | 343/457 |
| 5,055,851 | 10/1991 | Sheffer | 342/457 |
| 5,122,959 | 6/1992 | Nathanson et al. | 364/436 |
| 5,218,367 | 6/1993 | Sheffer et al. | 342/457 |
| 5,272,638 | 12/1993 | Martin et al. | 364/444 |
| 5,523,950 | 6/1996 | Peterson | 364/436 |
| 5,559,520 | 9/1996 | Barzegar et al. | 342/357 |

OTHER PUBLICATIONS

Saldin et al., "Magnavox Automatic Vehicle Location Pilot System for the Toronto Dept. of Ambulance Services," Vehicle Navigation & Info Sys., 1989 Conf., pp. 194–201.
Gray et al., "The Application of Automatic Vehicle Location in UK Ambulance Servics", IEE Colloq. (1993) No. 112, pp. 1–9.

Perlstein, "Automatic Vehicle Location Systems: A Tool for Computer Aided Dispatch Systems of the Future", Vehicle Navigation Info. Systems, 1989, pp. 186–193.

*Primary Examiner*—Michael Zanelli
*Assistant Examiner*—Edward J. Pipala
*Attorney, Agent, or Firm*—Wagner, Murobito & Hao

[57] ABSTRACT

A system and method for determining which of a plurality of vehicles is able to respond most quickly to an event. In one embodiment, the present invention divides a geographic region into a plurality of geographic cells. The present automatic vehicle recommendation system then calculates a response time for each of the plurality of vehicles to travel from each of the geographic cells to every other of the geographic cells. The position of each of the plurality of vehicles is monitored by an automatic vehicle location (AVL) system. The present automatic vehicle recommendation system then determines which of the plurality of vehicles is able to respond most quickly to an event reported to a computer aided dispatch (CAD) system. The event is located within one of the geographic cells. The present invention then communicates to the CAD system which of the plurality of vehicles is able to respond most quickly to the reported event. Thus, the present invention provides a system which automatically recommends which of a plurality of vehicles can respond most quickly to an event, a system which can function in conjunction with an existing AVL or CAD system, and a system which reduces CAD system operator decision making processes.

14 Claims, 6 Drawing Sheets

| | 86 | 88 | 90 | 92 | 94 | 96 | 98 | 100 |
|---|---|---|---|---|---|---|---|---|
| 86 | 2.6 | 1.9 | 2.8 | 4.8 | 1.0 | 2.6 | 3.1 | 6.0 |
| 88 | 1.9 | 2.1 | 2.0 | 4.0 | 1.1 | 1.1 | 1.7 | 5.0 |
| 90 | 2.8 | 2.0 | 1.9 | 1.1 | 2.8 | 1.0 | 1.8 | 3.0 |
| 92 | 4.8 | 4.0 | 1.1 | 2.2 | 3.0 | 4.9 | 1.4 | 2.0 |
| 94 | 1.0 | 1.1 | 2.8 | 3.0 | 2.0 | .90 | 2.5 | 5.5 |
| 96 | 2.6 | 1.1 | 1.0 | 4.9 | .90 | 1.5 | 1.1 | 3.0 |
| 98 | 3.1 | 1.7 | 1.8 | 1.4 | 2.5 | 1.1 | 2.0 | 2.1 |
| 100 | 6.0 | 5.0 | 3.0 | 2.0 | 5.5 | 3.0 | 2.1 | 3.0 |

AUTOMATED VEHICLE RECOMMENDATION SYSTEM

TECHNICAL FIELD

This invention relates to vehicle tracking and automatic vehicle location systems. Specifically, the present invention relates to computer-aided dispatch systems.

BACKGROUND ART

Vehicle tracking using an automatic vehicle location (AVL) system is well known in the art. In a typical AVL system, each of a plurality of vehicles communicates its position to a base station. The position of each of the vehicles is commonly superimposed over a simplified map to provide a graphical display of the position of the vehicles with respect to the underlying simplified map. An AVL system can also be used to dramatically enhance the function of a computer aided dispatch (CAD) system.

In one use of a CAD system, a system operator dispatches emergency vehicles to a reported event. For example, a 911 operator using a CAD system receives a phone call reporting a medical emergency. The CAD operator automatically receives information indicating the geographic position of the caller. (Often the event reported by the caller occurs nearby the location from which the caller is calling.) The geographic position of the caller is obtained, for example, by an automatic number identification/automatic location identification (ANI/ALI) system used in conjunction with a geo-file. By accessing an AVL system, the CAD operator is able to visually determine which of the displayed vehicles is positioned near or nearest to the location of the caller. However, an AVL system does not necessarily indicate which of the vehicles can respond most quickly to the location of the event reported by the caller. That is, although a first vehicle may appear to be physically closer than a second vehicle to the location of the event, a vehicle impeding barrier may exist between the first vehicle and the location of the reported event. The vehicle impeding barrier can be, for example, a building, a river, a one way street, and the like. Thus, even though the first vehicle appears to the CAD operator to be closer to the reported event, the second vehicle is able to more quickly respond to the event. Therefore, although an AVL system can enhance the functionality of a CAD system, an AVL system can not reliably determine which of a plurality of vehicles can respond most quickly to an event. The shortcomings of a combined AVL and CAD system are especially prevalent in an environment containing complex geographic features. Such environments include, for example, large metropolitan areas such as San Francisco, New York, Los Angeles, Boston, and the like.

As an additional drawback, prior art CAD systems or combined AVL and CAD systems require the CAD operator to decide which of a plurality of available vehicles can respond most quickly to a reported event. That is, even when the CAD operator is aware of vehicle impeding barriers, the CAD operator must consider the barriers when determining which vehicle to dispatch to the event. Furthermore, often the CAD system operator must choose which vehicle to dispatch while under the extreme pressure associated with handling life threatening events commonly reported to CAD system operators. As a result, CAD system operators may make errors even when the operators are aware of geographic and or vehicle impeding barriers present at or near the reported event. To make matters even worse for CAD system or combined AVL and CAD system operators, dispatch decisions must be made under rigorous time constraints. Hence, even well trained CAD operators may mistakenly dispatch the wrong vehicle or a slower responding vehicle to a reported event.

Thus, a need exists for a system which swiftly and automatically recommends which of a plurality of vehicles can respond most quickly to an event, a system which can function in conjunction with an existing AVL or CAD system, and a system which reduces CAD system operator decision making processes.

DISCLOSURE OF THE INVENTION

It is therefore an object of the present invention to provide a system which swiftly and automatically recommends which of a plurality of vehicles can respond most quickly to an event, a system which can function in conjunction with an existing AVL or CAD system, and a system which reduces CAD system operator decision making processes.

The above object has been achieved by an automatic vehicle recommendation system. Specifically, in one embodiment, the present invention divides a geographic region into a plurality of geographic cells. The present automatic vehicle recommendation system then calculates a response time for each of the plurality of vehicles to travel from each of the geographic cells to every other of the geographic cells. The position of each of the plurality of vehicles is monitored by an automatic vehicle location (AVL) system. The present automatic vehicle recommendation system then determines which of the plurality of vehicles is able to respond most quickly to an event reported to a computer aided dispatch (CAD) system. The event is located within one of the geographic cells. The present invention then communicates to the CAD system which of the plurality of vehicles is able to respond most quickly to the reported event. Thus, the present invention provides a system which automatically recommends which of a plurality of vehicles can respond most quickly to an event, a system which can function in conjunction with an existing AVL or CAD system, and a system which reduces CAD system operator decision making processes.

In another embodiment of the present invention, the steps listed above in conjunction with the previous embodiment are again performed. In the present embodiment, however, the geographic cells are formed in the following manner. A plurality of first geographic cells are partitioned from the geographic region along jurisdictional boundaries. The plurality of first geographic cells are then divided along any hydrographic features existing therein into a plurality of second geographic cells, wherein the plurality of second geographic cells are smaller than the plurality of first geographic cells. Next, the plurality of second geographic cells are divided along railway lines disposed therein into a plurality of third geographic cells, wherein the plurality of third geographic cells are smaller than the plurality of second geographic cells. In a similar manner, the plurality of third geographic cells are then divided along selected boundaries into a plurality of fourth geographic cells, wherein the plurality of fourth geographic cells are smaller than the plurality of third geographic cells. The division process continues along selected boundaries until geographic cells of a desired size are attained.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing", "computing", "estimating", "calculating", "determining", "displaying" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

Figure 1:
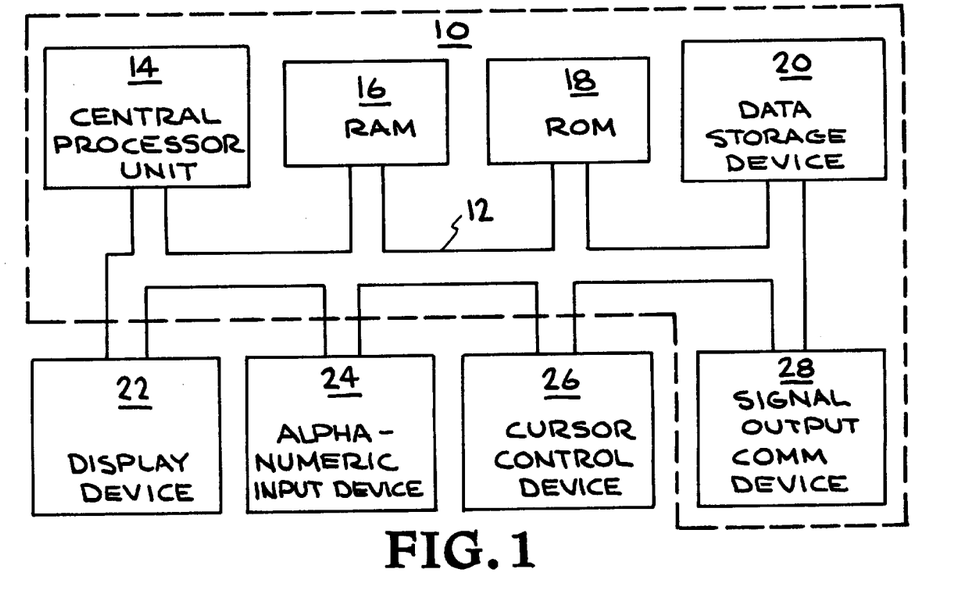
FIG. 1 is a schematic diagram of an exemplary computer system used as a part of a computer aided dispatch (CAD) system in accordance with the present invention.

With reference now to FIG. 1, portions of the present automatic vehicle recommendation system are comprised of computer executable instructions which reside in a computer system. FIG. 1 illustrates an exemplary computer system 10 used as a part of a computer aided dispatch (CAD) system in accordance with the present invention. In the present embodiment, CAD system 10 has AVL capabilities. The AVL portion of CAD system 10 allows CAD system 10 to track and monitor the position of vehicles which may be dispatched. It is appreciated that the CAD system 10 of FIG. 1 is exemplary only and that the present invention can operate within a number of different computer systems other than CAD systems including general purpose computers systems, embedded computer systems, and stand alone computer systems specially adapted for automatically recommending vehicles.

CAD system 10 of FIG. 1 includes an address/data bus 12 for communicating information, a central processor unit 14 coupled to bus 12 for processing information and instructions. CAD system 10 also incudes data storage features such as a random access memory 16 coupled to bus 12 for storing information and instructions for central processor unit 14, a read only memory 18 coupled to bus 12 for storing static information and instructions for the central processor unit 14, and a data storage device 20 (e.g., a magnetic or optical disk and disk drive) coupled to bus 12 for storing information and instructions. CAD system 10 of the present embodiment also includes a display device 22 coupled to bus 12 for displaying information (e.g., a list of recommended vehicles) to a CAD operator. An alphanumeric input device 24 including alphanumeric and function keys is coupled to bus 12 for communicating information and command selections to central processor unit 14. CAD system 10 also includes a cursor control device 26 coupled to bus 12 for communicating user input information and command selections to central processor unit 14, and a signal input output comm device 28 (e.g. a modem) coupled to bus 12 for communicating command selections to central processor unit 14.

Display device 22 of FIG. 1, utilized with CAD system 10 of the present invention, may be a liquid crystal device, cathode ray tube, or other display device suitable for creating graphic images and alphanumeric characters recognizable to the user. Cursor control device 26 allows the computer user to dynamically signal the two dimensional movement of a visible symbol (cursor) on a display screen of display device 22. Many implementations of cursor control device 26 are known in the art including a trackball, mouse, touch pad, joystick or special keys on alphanumeric input device 24 capable of signaling movement of a given direction or manner of displacement. Alternatively, it will be appreciated that a cursor can be directed and/or activated via input from alphanumeric input device 24 using special keys and key sequence commands. The present invention is also well suited to directing a cursor by other means such as, for example, voice commands.

Figure 2:
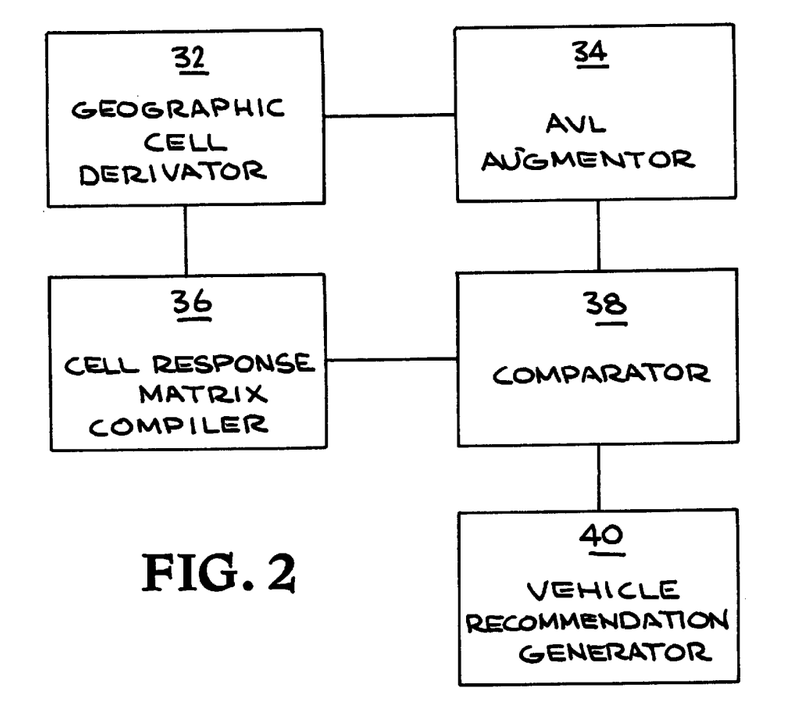
FIG. 2 is a logical representation of components of one embodiment of an automatic vehicle recommendation system in accordance with the present claimed invention.

FIG. 2 is a logical representation of components of one embodiment of the present automatic vehicle recommendation system. These components of FIG. 2 include a geographic cell derivator 32, an AVL augmentor 34, vehicle response time matrix compiler 36, a comparator 38, and a vehicle recommendation generator 40. In the present embodiment, geographic cell derivator 32, AVL augmentor 34, vehicle response time matrix compiler 36, comparator 38, and vehicle recommendation generator 40 are implemented as executable instructions within CAD system 10 of FIG. 1. A more detailed discussion of the components of the present invention and the steps performed by the components is found below.

GENERAL DESCRIPTION OF TRAJECTORY DETERMINING PROCESS OF THE PRESENT INVENTION

Figure 3:
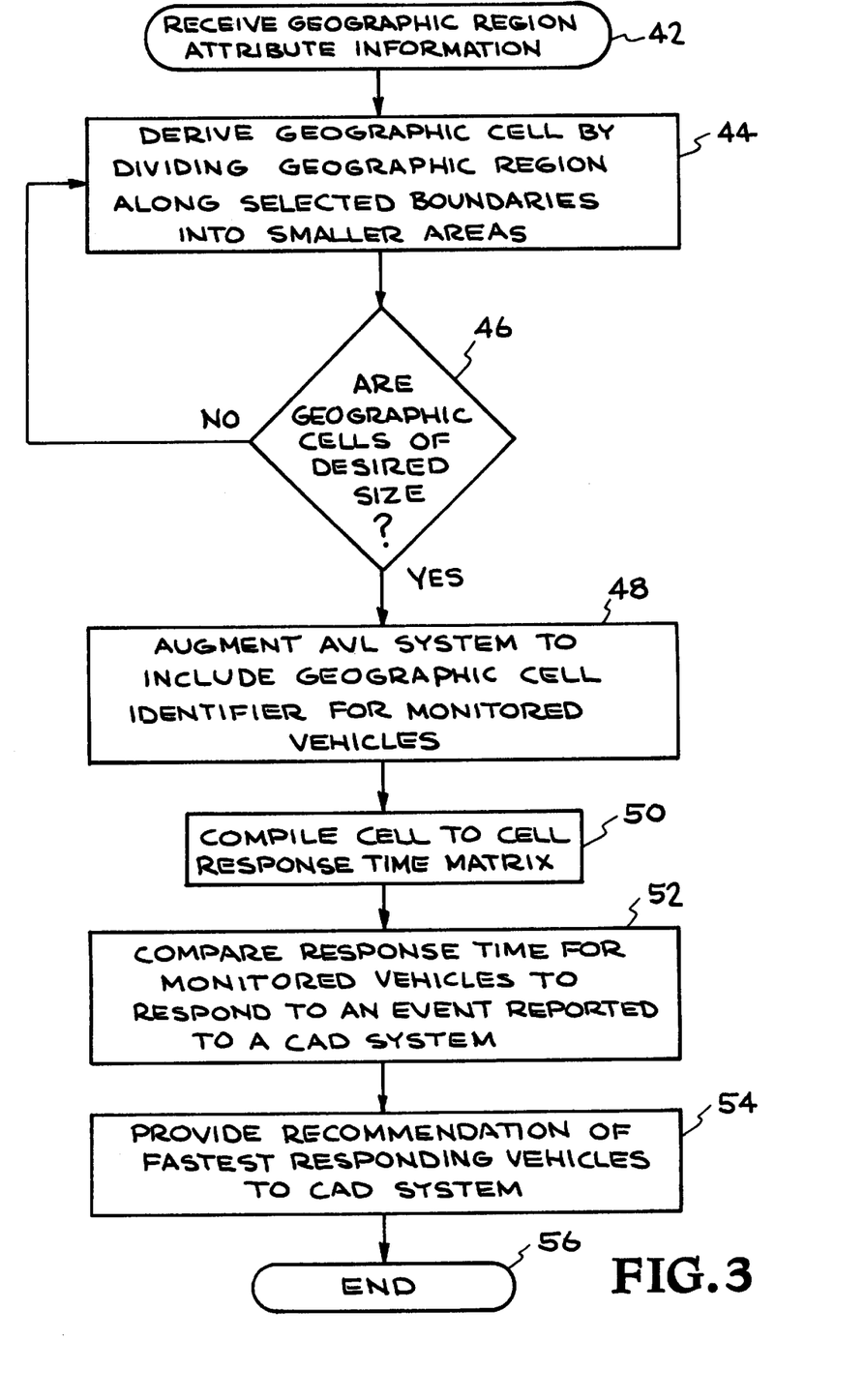
FIG. 3 is a flow chart illustrating steps employed by the automatic vehicle recommendation (AVR) system in accordance with the present claimed invention.

With reference next to FIG. 3, a flow chart illustrating steps employed by the automatic vehicle recommendation (AVR) process of the present invention is shown. During use of the present invention, an event such as, for example, a medical emergency is reported to an operator of a CAD system. The CAD system operator activates the present AVR invention by, for example, pushing an "AVR" marked button. The present AVR invention then recommends to the CAD system operator, which of a plurality of monitored vehicles is able to respond most quickly to the location of the reported event. The automatic vehicle recommending system of the present invention is described in detail below. In step 42, the present AVR system receives geographic region attribute information to be analyzed by the present AVR system. The geographic attribute information includes such items as, for example, vector street map information, jurisdictional areas and boundaries, hydrographic features, railways, callbox locations and the like. Although vector street map information, jurisdictional areas and boundaries, hydrographic features, railways, and callbox locations are specifically recited in the present embodiment, the present invention is also well suited to using numerous other types of vehicle impeding boundaries in the geographic cell derivation process of the present invention. The geographic cell derivation process recited in step 44 of the present invention will be discussed after the above-listed types of geographic attribute information received in step 42 have been examined.

Vector street map information, also referred to as the transportation layer, may include, for example, the physical layout of roadways within the geographic region of interest, the type of roadways present, the allowed direction of traffic flow on the roadways, the location of intersections, speed limits for the various roadways, and the like. The vector street map information is essential to the step of deriving geographic cells as recited in the present invention. The transportation network can also provide the means for computing an initial travel cost or vehicle response time matrix. In the present automatic vehicle recommendation system, the vector street map information may be either a proprietary data set developed by a local agency or one purchased commercially.

Jurisdictional areas and boundaries are often considered during the geographic cell derivation process of the present invention. Typical jurisdictional areas include police beats, fire still areas, dispatch regions, and the like. One reason jurisdictional areas and boundaries are significant in the geographic cell derivation process is because they often provide a convenient starting point for the derivation process. That is, a large geographic region can be initially partitioned into a first set of geographic cells simply by dividing the geographic region along jurisdictional boundaries. A second reason jurisdictional areas and boundaries are significant in the geographic cell derivation process is because the geographic cells formed by dividing the geographic region along jurisdictional boundaries are well suited to being used with a currently existing dispatch process.

Hydrographic features include bodies of water, streams, rivers, and the like. These features play a significant role in deriving geographic cells. A river is perhaps the most obvious example of a natural vehicle impeding barrier. The extent that these features influence geographic cell derivation in the present AVR system will, of course, vary from region to region. For example, hydrographic features are much more of a factor in San Francisco, Boston and Chicago than Los Angeles. If commercial vector street map information is being used, hydrographic features may be included therein. If hydrographic features are not included in the vector street map information, hydrographic feature information is obtained separately.

Railways are also an important factor in the geographic cells derivation process of the present invention. Because railroads often can only be crossed at specific places, i.e. railway crossings, railways provide significant vehicle impedance. Thus, railways are considered during the geographic cell derivation process of the present invention. Like hydrographic features, railway features are typically included in commercial vector street map databases but, if necessary, railway feature information may be obtained from other sources.

Callboxes are often the most valuable source used in the geographic cell derivation process of the present invention. In the past, before the advent of widespread residential telephone use, a callbox would be located, for example, at the corner of a residential block. If one of the homes in the residential block were to catch fire, a neighborhood inhabitant would activate the callbox. The fire department would then respond to the neighborhood represented by the activated callbox. Today, each callbox commonly represents a surrogate address family to be used as a key for fire engine or ambulance response scenarios. Most often the callboxes do not physically exist on the street. Instead, the physical callboxes have long since been removed but the notion of a callbox and its former location are still used for jurisdictional or dispatch purposes. Similarly, as a city grows, new callbox addresses may be created without ever erecting a callbox at the new address. Extensive callbox systems often exist in larger and older cities. In such cities, callboxes provide a complete and evenly distributed pattern throughout the city. As a further benefit, callboxes tend to be aligned along natural and man-made barriers such as rivers, highways, tunnels, railroads, and the like. Additionally, many current CAD systems are based on callbox-type dispatch scenarios.

With reference still to step 42, in the present invention, the geographic region attribute information is incorporated into a geographic information systems (GIS) database. In the present embodiment, the geographic region attribute information is incorporated into an ARC/INFO GIS database manufactured by Environmental Systems Research Institute (ESRI) of Redlands, Calif.

With reference next to step 44, after the geographic region attribute information has been received, the present invention derives geographic cells by dividing the geographic region into smaller areas. The present invention divides the geographic region along selected boundaries associated with the geographic region attribute information.

With reference next to FIG. 4A–4D, an example of the geographic cell derivation process recited in step 44 is shown. Geographic cell derivator 32 of FIG. 2, utilizes the geographic region attribute information to partition geographic region 60 of FIG. 4A along jurisdictional boundaries 62a and 62b into smaller geographic cells 64, 66, and 68. It will be understood that the exact partitioning of geographic region 60 will be based upon the location and arrangement of the jurisdictional boundaries. Furthermore, the entire partitioning process will vary for each geographic region based upon the location and arrangement of all various boundaries considered during geographic cell derivation process 44.

Figure 4A:
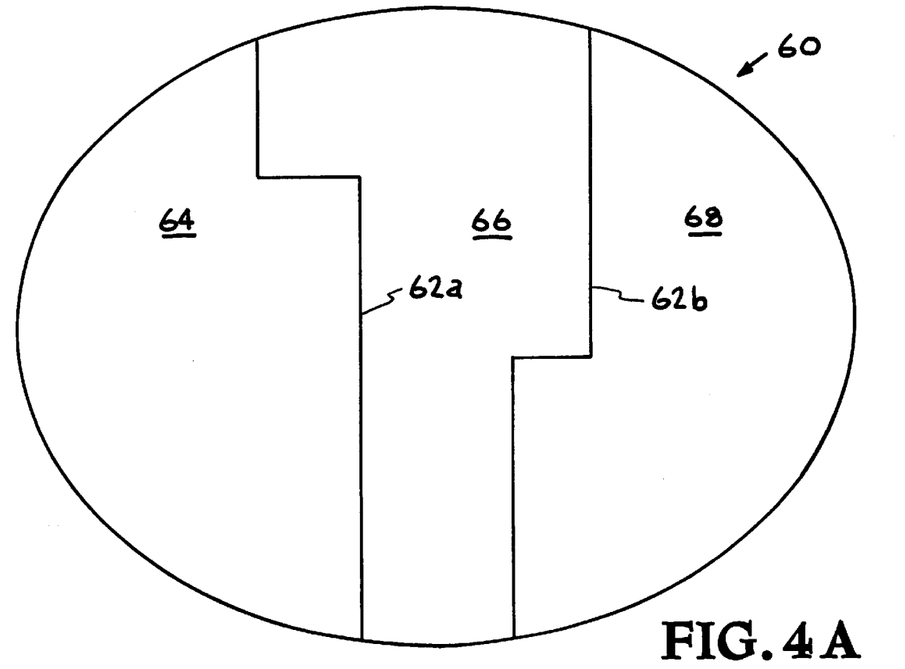
FIGS. 4A–4D are schematic diagrams illustrating a geographic cell derivation process employed by an automatic vehicle recommendation (AVR) system in accordance with the present claimed invention.
Figure 4B:
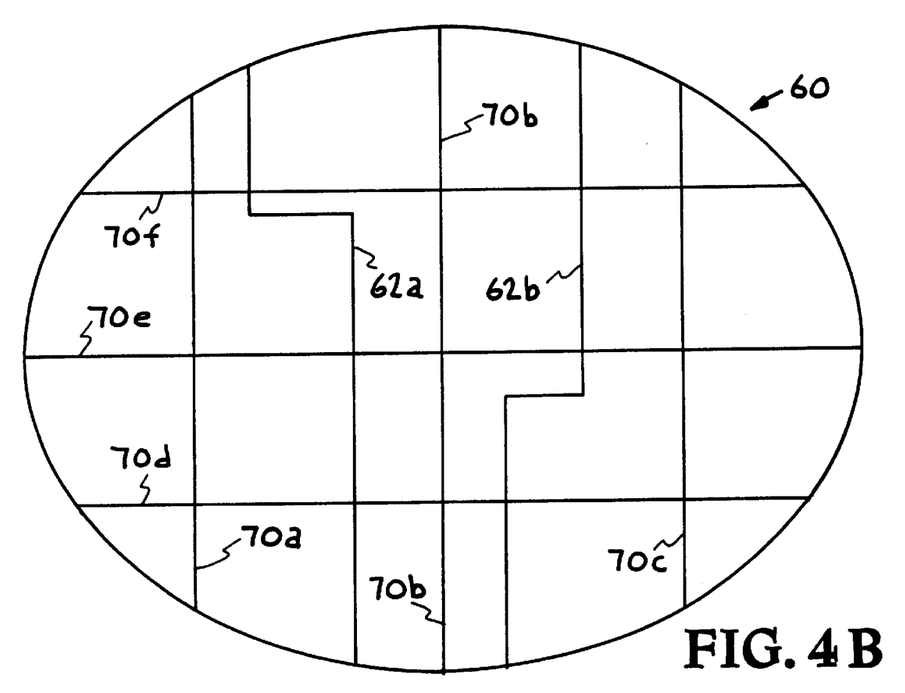

With reference next to FIG. 4B, in the present embodiment geographic region 60 is then partitioned by geographic cell derivator 32 along boundaries 70a–70f associated with the vector street map information. After partitioning geographic region 60 along boundaries 70a–70f, 24 smaller geographic cells are formed.

Figure 4C:
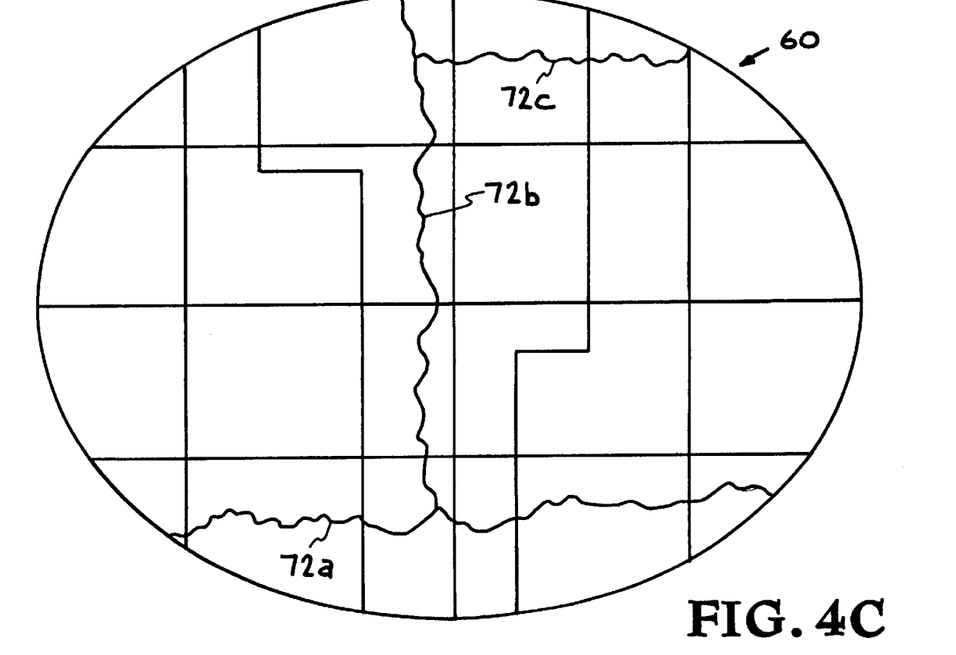

As shown in FIG. 4C, in the present embodiment geographic cell derivator 32 continues the geographic cell derivation process of step 44 by further partitioning geographic region 60 along hydrographic feature related boundaries 72a–72c. 37 smaller geographic cells are derived by partitioning geographic region 60 along boundaries 72a–72c and previously described boundaries 62a, 62b, and 70a–70f.

Figure 4D:
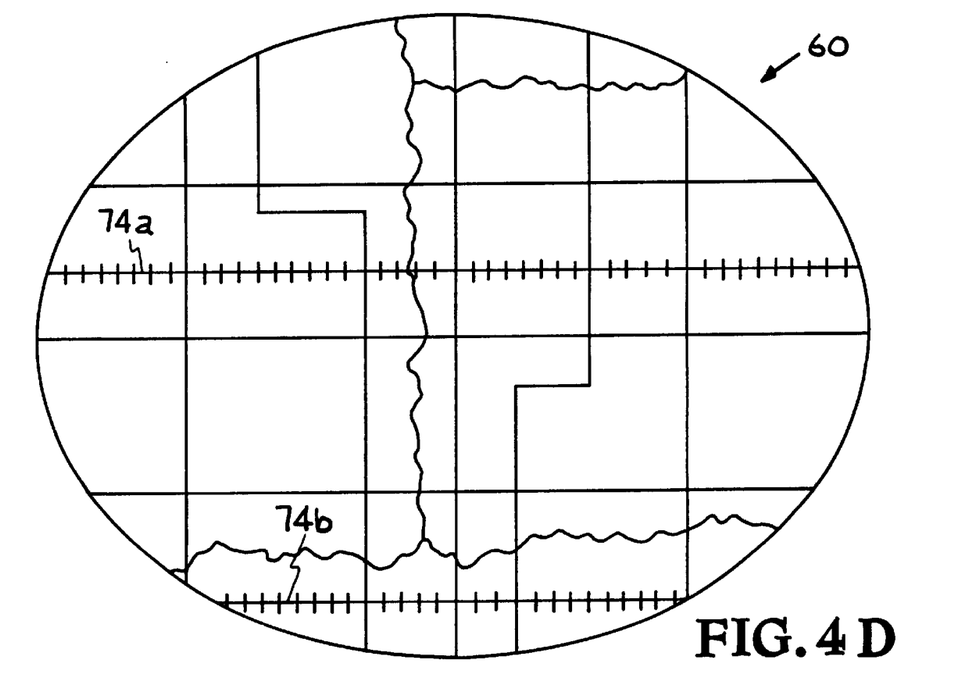

Referring now to FIG. 4D, in the present embodiment geographic cell derivator 32 continues the geographic cell derivation process of step 44 by further partitioning geographic region 60 along railway related boundaries 74a and 74b. 50 smaller geographic cells are derived by partitioning geographic region 60 along boundaries 74a and 74b and previously described boundaries 62a, 62b, 70a–70f, and 72a–72c. Although geographic region 60 is partitioned as described above in the present embodiment, the present invention is also well suited to deriving geographic cells from geographic region 60 using other vehicle impeding boundaries or features, by using fewer or greater boundaries, or by using any combination of the above-mentioned boundaries and features.

Figure 5:
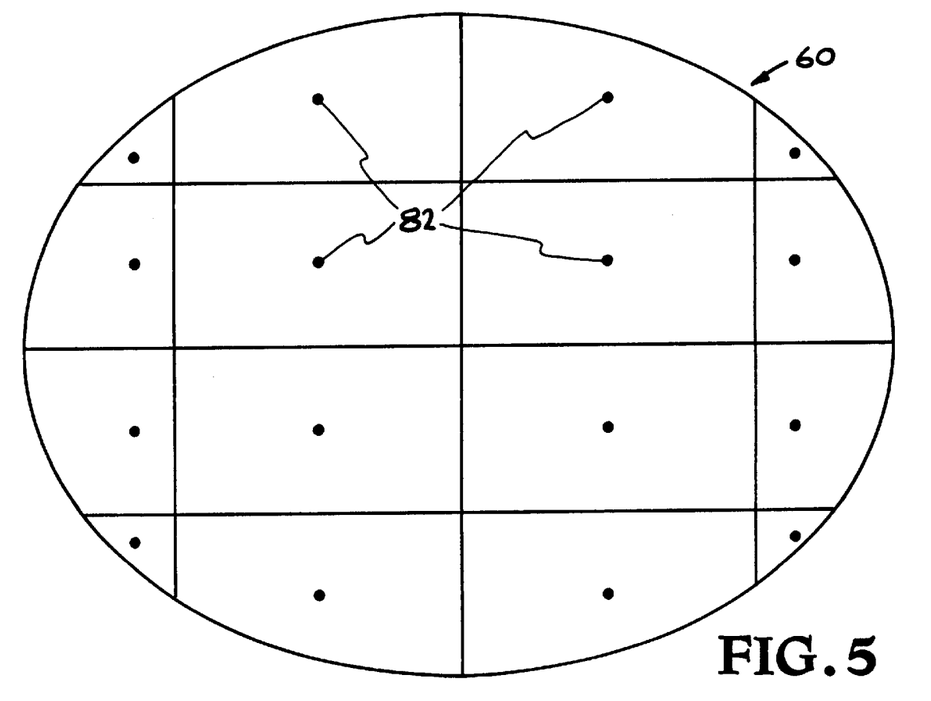
FIG. 5 is a schematic diagram illustrating another geographic cell derivation process employed by an automatic vehicle recommendation (AVR) system in accordance with the present claimed invention.

With reference now to FIG. 5, a schematic diagram of a geographic region 80 containing numerous callboxes, typically referenced as 82, is shown. In geographic region 80, geographic cells can be derived by partitioning geographic region 80 around callboxes 82. That is, each call box acts as a center or nucleus for a geographic cell. As shown in FIG. 5, geographic region 80 is completely and substantially equally partitioned along using callboxes 82. In an instance where the callboxes are not completely or uniformly spread throughout the geographic region, cell derivation process occurs using the available callboxes in combination with vector street map information, jurisdictional areas and boundaries, hydrographic features, railways, and the like. Thus, callboxes provide yet another means for deriving geographic cells from a geographic region.

With reference now to step 46 of FIG. 3, the present invention determines whether the geographic cells are of a desired size. In the present embodiment, the geographic cell derivation process of step 44 continues until the center of each geographic cell is approximately one-third to one-fourth of a mile from the center of the nearest geographic cell. Although such a geographic cell size is specified in the present embodiment, the present invention is also well suited to deriving geographic cells of various other sizes. When the size of the geographic cells partitioned from the geographic region is not as small as desired, geographic cell derivator 32 of FIG. 2 repeats the derivation process using vector street map information, jurisdictional areas and boundaries, hydrographic features, railways, and the like. Once the geographic cells are of the desired size, geographic cell derivator ceases the partitioning of the geographic region. Thus, in step 46 of the present invention, the size of the geographic cells formed after each geographic cell derivation process is analyzed to determine whether additional partitioning of the geographic region is required.

With reference next to step 48, AVL augmentor 34 of FIG. 2 supplements the AVL portion of CAD system 10 of FIG. 1 with the geographic cell information. More specifically, AVL augmentor 34 assigns a geographic cell identifier to each vehicle monitored by the AVL system. AVL augmentor 34 incorporates a geographic cell identifier into the standard latitude, longitude, elevation, time, speed, and heading information provided by the AVL portion of CAD system 10. Thus, the AVL portion of CAD system 10 also reports the geographic cell in which each monitored vehicle is located. Therefore, AVL augmentor 34 of the present invention functions as a server to the AVL system portion of CAD system 10.

Figure 6:
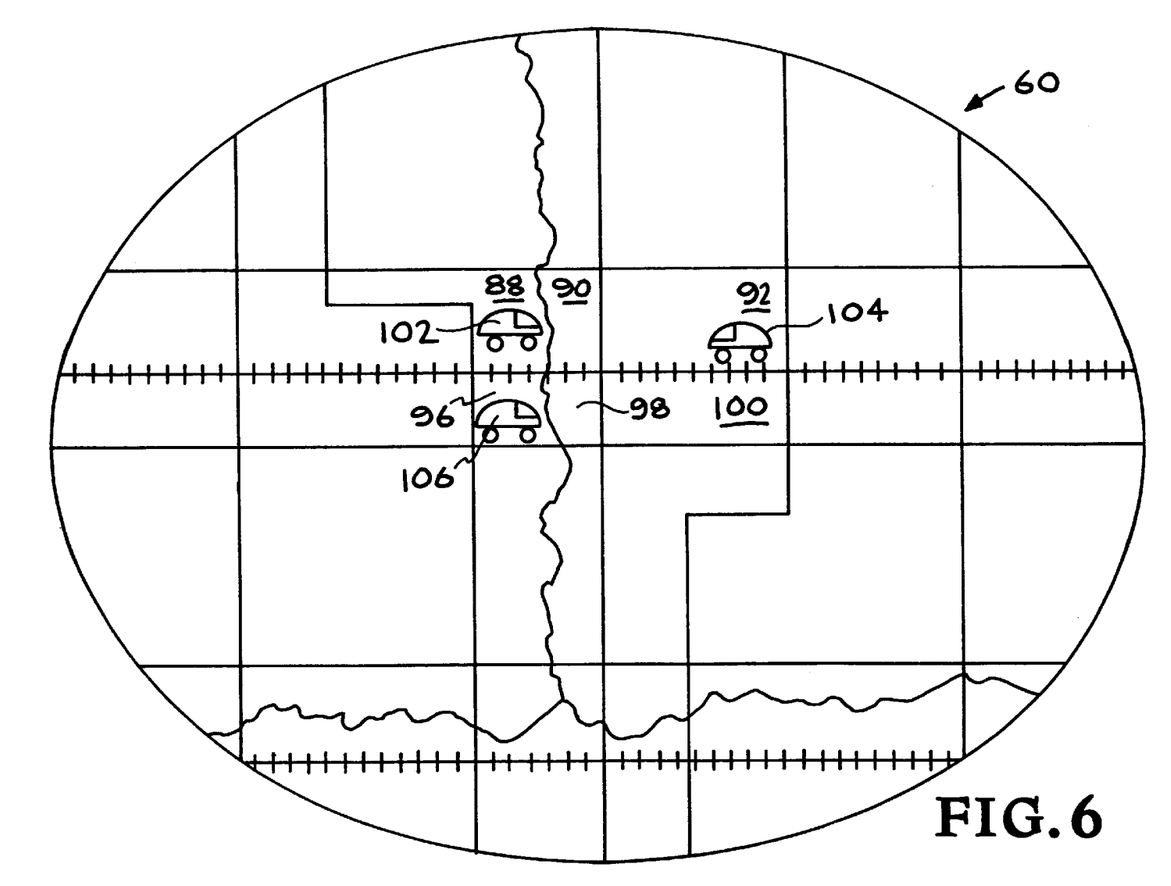
FIG. 6 is a schematic diagram of a geographic region partitioned into geographic cells by an automatic vehicle recommendation (AVR) system in accordance with the present claimed invention.

FIG. 6 shows the partitioned geographic region 60 of FIG. 4D including geographic cells numbered 86, 88, 90, 92, 94, 96, 98, and 100. Although the present invention assigns a unique identifier to each of the geographic cells, only a few of the geographic cells are numbered in FIG. 6 for purposes of clarity. As shown in FIG. 6, vehicles 102, 104, and 106 are located in geographic cells 88, 92, and 96 respectively. AVL augmentor 34 of FIG. 2 supplements the AVL portion of CAD system 10 of FIG. 1, such that the AVL system reports the latitude, longitude, elevation, time, speed, and heading of vehicle 102 and also reports that vehicle 102 is located in geographic cell 88. Likewise, AVL augmentor 34 caused the AVL system to report in which of the previously partitioned geographic cells vehicles 104 and 106 are located. As the vehicles move into and out of different geographic cells, AVL augmentor 34 continues to supplement the AVL system with the current geographic cell identifier information for each of the monitored vehicles. The present invention is also well suited for use with station based or posted vehicles. In such a case, AVL augmentor 34 continues to supplement CAD system 10 with the geographic cell identifier corresponding to the location at which the vehicle is based or posted. If an AVL system is used to track the vehicle once it leaves the station or its posting location, AVL augmentor 34 supplements the AVL portion of CAD system 10 with the current geographic cell location of the monitored vehicle.

With reference next to step 50 of FIG. 3, the present invention compiles a geographic vehicle response time matrix. Vehicle response time matrix compiler 36 of FIG. 2, computes the time for a vehicle to travel from one geographic cell to another geographic cell. Although the present invention is well suited to computing the vehicle response time for the vehicle to travel from each geographic cell to every other geographic cell in a geographic region, the following description will discuss in detail only vehicle response times between geographic cells 86, 88, 90, 92, 94, 96, 98, and 100 of FIG. 6 for purposes of clarity.

Figure 7:
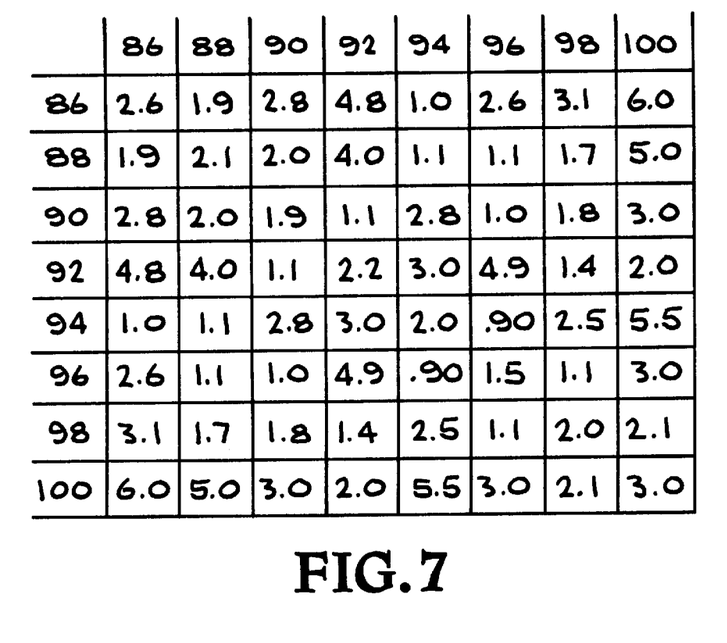
FIG. 7 is a vehicle response time matrix formed by a vehicle response time matrix compiler of an automatic vehicle recommendation (AVR) system in accordance with the present claimed invention.

With reference next to FIG. 7, a vehicle response time matrix formed according to one embodiment of the present invention is shown. In the present embodiment, the cost or time in minutes needed for the vehicle to travel to any given cell is represented in matrix format as shown in FIG. 7. The present invention is also well suited to compiling the vehicle response times in a format other than a matrix such as, for example, a list, a graph, and the like. Vehicle response time matrix compiler 36 computes the geographic cell to geographic cell vehicle response times in any one of several ways. A first approach computes a crow flies distance and then divides the crow flies distance by a selected vehicle travel rate. In the present embodiment, the selected vehicle travel rate is based upon average vehicle travel rates in the geographic region. However, the present invention is also well suited to selecting vehicle travel rates based upon the types of streets present in the geographic region, the types of vehicles being monitored, and various other factors. Although vehicle response time matrix compiler 36 is able to attain vehicle response times using the crow flies approach, such an approach is used primarily as a far field approximation. That is, the crow flies approach does not take into account the geographic attribute information of the geographic region. Therefore, in the present embodiment, the crow flies approach is invoked by vehicle response time matrix compiler 36 only to populate the vehicle response time matrix. More specifically, in the present embodiment, the crow flies approach is used only for computing vehicle response times between distant geographic cells. If a vehicle is located very distant from a specific geographic cell, that vehicle will probably not be considered as one of the vehicles which might respond to an emergency in that specific geographic cell. Therefore, a precise vehicle response time for the vehicle to travel to the distantly located geographic cell is rarely necessary in the present embodiment.

Another approach used by vehicle response time matrix compiler 36 uses transportation network and routing information for the geographic region. In such an approach, vehicle response time matrix compiler 36 considers factors such as posted speed limits, the number of intersections, and the like, along a known route from a geographic cell to another geographic cell. In so doing, vehicle response time matrix compiler 36 computes an accurate prediction of vehicle response travel times between geographic cells. By computing vehicle response times using transportation network and routing information, the present invention provides significant benefits to an operator of CAD system 10 of FIG. 1. As an example, although one vehicle may appear to be more closely located to a reported event, vehicle response time matrix compiler 36 of the present invention can show that another more distantly located vehicle is actually able to respond more quickly to the reported event.

As yet another approach, vehicle response time matrix compiler 36 is also well suited to using operationally determined vehicle response times. In such an instance, vehicle response time matrix compiler 36 uses previously recorded reports of the time it took for a vehicle to travel from one geographic cell to another geographic cell. Such an approach is used when the present invention is employed with an existing CAD or AVL system which has been recording vehicle response times. Vehicle response time matrix compiler 36 is also well suited to using operationally determined vehicle response times to upgrade previous prediction of vehicle response travel times between geographic cells. That is, in the present embodiment, the present invention records actual vehicle response times. These operationally determined response times are used to replace estimated vehicle response times which appear inaccurate. In so doing, the present AVR system becomes more accurate the longer it is used. Thus, the present invention is a self-learning system whose accuracy improves with use.

The present invention is also well suited to using operationally determined response times to amend or reconstruct geographic cells. For example, if an operationally determined vehicle response time is much greater than a predicted response time, a significant vehicle impeding attribute may have been missed during the geographic cell derivation process. In such an instance, the present invention is well suited to amending the size or borders of one or more of the previously partitioned geographic cells. Thus, the accuracy of the present invention becomes even greater the longer it is used.

In the present embodiment, vehicle response time matrix compiler 36 only determines approximately 20 percent of all possible geographic cell to geographic cell combinations using transportation network and routing information, operationally determined vehicle response times, or combinations thereof. The rest of the possible geographic cell to geographic cell combinations are computed by vehicle response time matrix compiler 36 using crow flies computations. As stated above, if a vehicle is located very distant from a specific geographic cell, that vehicle will probably not be considered as one of the vehicles which might respond to an emergency in that specific geographic cell. Therefore, a precise vehicle response time for the vehicle to travel to the distantly located geographic cell is rarely necessary in the present embodiment. The present invention also determines intra-cell vehicle response times. Such times indicate the required time for a vehicle to move across a single geographic cell. In so doing, the present invention is able to show that a vehicle in the same geographic cell as the reported event may not be the vehicle which is able to respond most quickly to the event.

The present invention is also well suited to using operationally determined response times to determine whether vehicle response time matrix compiler 36 should construct an alternate matrix. For example, operationally determined vehicle response times may vary greatly under certain conditions such as, for example, inclement weather, rush hour traffic, and the like. If such variations occur, vehicle response time matrix compiler 36 is well suited to compiling at least a second vehicle response time matrix. The second vehicle response time matrix is employed in the AVR system of the present invention time when conditions warrant. In such an embodiment, the operator of CAD system 10 of FIG. 1 would select the matrix which corresponds to current conditions. Thus, the present invention is well suited to accurately compensating for vehicle rate altering conditions.

With reference next to step 52 of FIG. 3, the present invention compares the time required for the monitored vehicles to respond to a reported event. Comparator 38 of FIG. 2, compares the time for each of the monitored vehicles to travel from the respective geographic cell in which they are currently located to the geographic cell in which reported event occurred. Comparator 38 uses the vehicle response matrix compiled in step 50 to determine the predicted response time for each of the monitored vehicles. The present invention is well suited to limiting the comparison by comparator 38 to certain vehicles. For example, if the reported event is a medical emergency, a CAD system operator can select to only have ambulances considered by comparator 38 of the present AVR system.

With reference next to step 54 of FIG. 3, the present invention provides a recommendation of the fastest responding vehicles to the CAD system operator. In the present embodiment, vehicle recommendation generator 40 of FIG. 2, displays, on a graphic display of CAD system 10 of FIG. 1, which vehicle will be able to respond most quickly to the reported event. Although a single vehicle is recommended in the present embodiment the present invention is also well suited to displaying a list of the available vehicles ranked from fastest responding vehicle to slowest responding vehicle. The present invention is also well suited to other vehicle recommending methods including but not limited to using voice synthesis logic to audibly recommend a vehicle, and the like. Furthermore, the present invention is also well suited to having a single AVR activator button located at CAD system 10. In so doing, an operator of CAD system 10 can activate the present invention simply, quickly, and without requiring a complex decision making process.

In summary the present invention is used in the following manner. Geographic cell derivator 32 of FIG. 2 divides a geographic region into a plurality of geographic cells. AVL augmentor 34 supplements an AVL portion of a CAD system with the a geographic cell identifier for each monitored vehicle. Cell response matrix compiler then calculates a response time for each of the plurality of vehicles to travel from each of the geographic cells to every other of the geographic cells. Once an event such as, for example, a medical emergency is reported to an operator of a CAD system, the CAD system operator activates the present AVR invention by, for example, pushing an "AVR" marked button. Comparator 38 then determines which of the plurality of monitored vehicles is able to respond most quickly to the geographic cell in which the reported event is located. Vehicle recommendation generator 40 then communicates to the CAD system which of the plurality of monitored vehicles is able to respond most quickly to the reported event.

Thus, the present invention provides a system which swiftly and automatically recommends which of a plurality of vehicles can respond most quickly to an event, a system which can function in conjunction with an existing AVL or CAD system, and a system which reduces CAD system operator decision making processes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A system for indicating the fastest responding vehicle within a geographic area comprising:

an automatic vehicle location system for tracking vehicles within a geographic area;

a computer aided dispatch system coupled to said automatic vehicle location system; and an automatic vehicle recommendation system coupled to said computer aided dispatch system and said automatic vehicle location system, said automatic vehicle recommendation system for communicating to said computer aided dispatch system which of said vehicles is able to respond in the shortest time to an event reported to said computer aided dispatch system, said automatic vehicle recommendation system further comprising:

a cell database comprising a plurality of geographic cells subdivided from said geographic area, a cost matrix comprising response times for said vehicles to travel from one of said geographic cells to another of said geographic cells, said cost matrix further comprising vehicle response times required to travel from each of said geographic cells to every other of said geographic cells.

2. The system of claim 1 further wherein said cost matrix further comprises vehicle response times required to travel from a first point in one of said geographic cells to a second point within said same geographic cell.

3. The system of claim 1 wherein said automatic vehicle recommendation system is integral with said computer aided dispatch system.

4. The system of claim 3 wherein said computer aided dispatch system includes user controls for activating said automatic vehicle recommendation system.

5. In a computer system including a processor coupled to a bus, and a memory unit coupled to said bus for storing information, a computer-implemented method for indicating which of a plurality of vehicles is able to respond most quickly to an event within a geographic area comprising the steps of:

a) dividing a geographic region along jurisdictional boundaries into a plurality of geographic cells;

b.) calculating a response time for a vehicle to travel from a first of said geographic cells to a second of said geographic cells;

c.) incorporating geographic cell information into an automatic vehicle location system such that position information for each of a plurality of vehicles monitored by said automatic vehicle location system further comprises an indication of said geographic cell in which each of said plurality of vehicles is located;

d) determining which of said plurality of vehicles is able to respond most quickly to an event reported to a computer aided dispatch system, wherein said event is located within one of said geographic cells; and e) communicating to said computer aided dispatch system which of said plurality of vehicles is able to respond most quickly to said event.

6. In a computer system including a processor coupled to a bus, and a memory unit coupled to said bus for storing information, a computer-implemented method for indicating which of a plurality of vehicles is able to respond most quickly to an event within a geographic area comprising the steps of:

a) dividing a geographic region into a plurality of geographic cells comprising the steps of:

dividing said geographic region along callbox boundaries into a plurality of first geographic cells;

dividing said plurality of first geographic cells along vector street map features into a plurality of second geographic cells, wherein said plurality of second geographic cells are smaller than said plurality of first geographic cells;

dividing said plurality of second geographic cells along hydrographic features into a plurality of third geographic cells, wherein said plurality of third geographic cells are smaller than said plurality of second geographic cells;

dividing said plurality of third geographic cells along railway lines into a plurality of fourth geographic cells, wherein said plurality of fourth geographic cells are smaller than said plurality of third geographic cells;

dividing said plurality of fourth geographic cells along selected boundaries into a plurality of fifth geographic cells, wherein said plurality of fifth geographic cells are smaller than said plurality of fourth geographic cells; and dividing said fifth geographic cells into smaller geographic cells until said smaller geographic cells are of a desired size;

b.) calculating a response time for a vehicle to travel from a first of said geographic cells to a second of said geographic cells;

c.) incorporating geographic cell information into an automatic vehicle location system such that position information for each of a plurality of vehicles monitored by said automatic vehicle location system further comprises an indication of said geographic cell in which each of said plurality of vehicles is located;

d) determining which of said plurality of vehicles is able to respond most quickly to an event reported to a computer aided dispatch system, wherein said event is located within one of said geographic cells; and e) communicating to said computer aided dispatch system which of said plurality of vehicles is able to respond most quickly to said event.

7. In a computer system including a processor coupled to a bus, and a memory unit coupled to said bus for storing information, a computer-implemented method for indicating which of a plurality of vehicles is able to respond most quickly to an event within a geographic area comprising the steps of:

a) dividing a geographic region along callbox dependent boundaries into a plurality of geographic cells;

b.) calculating a response time for a vehicle to travel from a first of said geographic cells to a second of said geographic cells;

c.) incorporating geographic cell information into an automatic vehicle location system such that position information for each of a plurality of vehicles monitored by said automatic vehicle location system further comprises an indication of said geographic cell in which each of said plurality of vehicles is located;

d) determining which of said plurality of vehicles is able to respond most quickly to an event reported to a computer aided dispatch system, wherein said event is located within one of said geographic cells; and e) communicating to said computer aided dispatch system which of said plurality of vehicles is able to respond most quickly to said event.

8. In a computer system including a processor coupled to a bus, and a memory unit coupled to said bus for storing information, a computer-implemented method for indicating which of a plurality of vehicles is able to respond most quickly to an event within a geographic area comprising the steps of:

a) dividing a geographic region along hydrographic boundaries into a plurality of geographic cells;

b.) calculating a response time for a vehicle to travel from a first of said geographic cells to a second of said geographic cells;

c.) incorporating geographic cell information into an automatic vehicle location system such that position information for each of a plurality of vehicles monitored by said automatic vehicle location system further comprises an indication of said geographic cell in which each of said plurality of vehicles is located;

d) determining which of said plurality of vehicles is able to respond most quickly to an event reported to a computer aided dispatch system, wherein said event is located within one of said geographic cells; and e) communicating to said computer aided dispatch system which of said plurality of vehicles is able to respond most quickly to said event.

9. In a computer system including a processor coupled to a bus, and a memory unit coupled to said bus for storing information, a computer-implemented method for indicating which of a plurality of vehicles is able to respond most quickly to an event within a geographic area comprising the steps of:

a) dividing a geographic region along railway boundaries into a plurality of geographic cells;

b.) calculating a response time for a vehicle to travel from a first of said geographic cells to a second of said geographic cells;

c.) incorporating geographic cell information into an automatic vehicle location system such that position information for each of a plurality of vehicles monitored by said automatic vehicle location system further comprises an indication of said geographic cell in which each of said plurality of vehicles is located;

d) determining which of said plurality of vehicles is able to respond most quickly to an event reported to a computer aided dispatch system, wherein said event is located within one of said geographic cells; and e) communicating to said computer aided dispatch system which of said plurality of vehicles is able to respond most quickly to said event.

10. In a computer system including a processor coupled to a bus, and a memory unit coupled to said bus for storing information, a computer-implemented method for indicating which of a plurality of vehicles is able to respond most quickly to an event within a geographic area comprising the steps of:

a) dividing a geographic region along vehicle impeding boundaries into a plurality of geographic cells;

b.) calculating a response time for a vehicle to travel from a first of said geographic cells to a second of said geographic cells;

c.) incorporating geographic cell information into an automatic vehicle location system such that position information for each of a plurality of vehicles monitored by said automatic vehicle location system further comprises an indication of said geographic cell in which each of said plurality of vehicles is located;

d) determining which of said plurality of vehicles is able to respond most quickly to an event reported to a computer aided dispatch system, wherein said event is located within one of said geographic cells; and e) communicating to said computer aided dispatch system which of said plurality of vehicles is able to respond most quickly to said event.

11. In a computer system including a processor coupled to a bus, and a memory unit coupled to said bus for storing information, a computer-implemented method for indicating which of a plurality of vehicles is able to respond most quickly to an event within a geographic area comprising the steps of:

a) dividing a geographic region into a plurality of geographic cells, said step of dividing said geographic region into a plurality of geographic cells further comprises the steps of:

dividing said geographic region along jurisdictional boundaries into a plurality of first geographic cells;

dividing said plurality of first geographic cells along vector street map features into a plurality of second geographic cells, wherein said plurality of second geographic cells are smaller than said plurality of first geographic cells;

dividing said plurality of second geographic cells along hydrographic features into a plurality of third geographic cells, wherein said plurality of third geographic cells are smaller than said plurality of second geographic cells;

dividing said plurality of third geographic cells along railway lines into a plurality of fourth geographic cells, wherein said plurality of fourth geographic cells are smaller than said plurality of third geographic cells;

dividing said plurality of fourth geographic cells along selected boundaries into a plurality of fifth geographic cells, wherein said plurality of fifth geographic cells are smaller than said plurality of fourth geographic cells; and dividing said fifth geographic cells into smaller geographic cells until said smaller geographic cells are of a desired size;

b.) calculating a response time for a vehicle to travel from a first of said geographic cells to a second of said geographic cells;

c.) incorporating geographic cell information into an automatic vehicle location system such that position information for each of a plurality of vehicles monitored by said automatic vehicle location system further comprises an indication of said geographic cell in which each of said plurality of vehicles is located;

d) determining which of said plurality of vehicles is able to respond most quickly to an event reported to a computer aided dispatch system, wherein said event is located within one of said geographic cells; and e) communicating to said computer aided dispatch system which of said plurality of vehicles is able to respond most quickly to said event.

12. In a computer system including a processor coupled to a bus, and a memory unit coupled to said bus for storing information, a computer-implemented method for indicating which of a plurality of vehicles is able to respond most quickly to an event within a geographic area comprising the steps of:

a) dividing a geographic region into a plurality of geographic cells, said step of dividing a geographic region into a plurality of geographic cells further comprises the steps of:

dividing said geographic region along callbox boundaries into a plurality of first geographic cells;

dividing said plurality of first geographic cells along vector street map features into a plurality of second geographic cells, wherein said plurality of second geographic cells are smaller than said plurality of first geographic cells;

dividing said plurality of second geographic cells along hydrographic features into a plurality of third geographic cells, wherein said plurality of third geographic cells are smaller than said plurality of second geographic cells;

dividing said plurality of third geographic cells along railway lines into a plurality of fourth geographic cells, wherein said plurality of fourth geographic cells are smaller than said plurality of third geographic cells;

dividing said plurality of fourth geographic cells along selected boundaries into a plurality of fifth geographic cells, wherein said plurality of fifth geographic cells are smaller than said plurality of fourth geographic cells; and dividing said fifth geographic cells into smaller geographic cells until said smaller geographic cells are of a desired size;

b.) calculating a response time for a vehicle to travel from a first of said geographic cells to a second of said geographic cells;

c.) incorporating geographic cell information into an automatic vehicle location system such that position information for each of a plurality of vehicles monitored by said automatic vehicle location system further comprises an indication of said geographic cell in which each of said plurality of vehicles is located;

d) determining which of said plurality of vehicles is able to respond most quickly to an event reported to a computer aided dispatch system, wherein said event is located within one of said geographic cells; and e) communicating to said computer aided dispatch system which of said plurality of vehicles is able to respond most quickly to said event.

13. In a computer system including a processor coupled to a bus, and a memory unit coupled to said bus for storing information, a computer-implemented method for indicating which of a plurality of vehicles is able to respond most quickly to an event within a geographic area comprising the steps of:

a) dividing a geographic region into a plurality of geographic cells;

b.) calculating a response time for a vehicle to travel from each of said geographic cells to every other of said geographic cells;

c.) incorporating geographic cell information into an automatic vehicle location system such that position information for each of a plurality of vehicles monitored by said automatic vehicle location system further comprises an indication of said geographic cell in which each of said plurality of vehicles is located;

d) determining which of said plurality of vehicles is able to respond most quickly to an event reported to a computer aided dispatch system, wherein said event is located within one of said geographic cells; and e) communicating to said computer aided dispatch system which of said plurality of vehicles is able to respond most quickly to said event.

14. In a computer system including a processor coupled to a bus, and a memory unit coupled to said bus for storing information, a computer-implemented method for indicating which of a plurality of vehicles is able to respond most quickly to an event within a geographic area comprising the steps of:

a) dividing a geographic region into a plurality of geographic cells;

b.) calculating a response time for a vehicle to travel from each of said geographic cells to every other of said geographic cells, said step of calculating said response time for said vehicle to travel from each of said geographic cells to every other of said geographic cells further comprising the steps of:

calculating a vehicle response time using a combination of:
   i) dividing respective distances from each of said geographic cells to every other of said geographic cells by an expected vehicle travel rate;
   ii) calculating respective vehicle response times from each of said geographic cells to every other of said geographic cells using transportation network information and an expected vehicle travel rate; and
   iii) calculating respective vehicle response times using respective operationally determined response times for a vehicle to travel from each of said geographic cells to every other of said geographic cells;

c.) incorporating geographic cell information into an automatic vehicle location system such that position information for each of a plurality of vehicles monitored by said automatic vehicle location system further comprises an indication of said geographic cell in which each of said plurality of vehicles is located;

d) determining which of said plurality of vehicles is able to respond most quickly to an event reported to a computer aided dispatch system, wherein said event is located within one of said geographic cells; and e) communicating to said computer aided dispatch system which of said plurality of vehicles is able to respond most quickly to said event.

* * * * *

UNITED STATES PATENT AND TRADEMARK OFFICE
CERTIFICATE OF CORRECTION

PATENT NO.   : 5,812,959
DATED        : September 22, 1998
INVENTOR(S)  : Peter L. Froeberg and Robert P. Laudati It is certified that error appears in the above-identified patent and that said Letters Patent is hereby corrected as shown below:

On the title page of Issued Patent 5,812,959, first named inventor's name is spelled incorrectly. The correct spelling is Peter L. Froeberg.

Signed and Sealed this

Sixteenth Day of February, 1999

Attest:

Attesting Officer

*Acting Commissioner of Patents and Trademarks*